July 6, 1965　　　W. T. MARTIN　　　3,192,850
MANIFOLD

Filed Feb. 1, 1963　　　　　　　　　　　2 Sheets-Sheet 1

WAYNE T. MARTIN
INVENTOR

July 6, 1965 W. T. MARTIN 3,192,850
MANIFOLD
Filed Feb. 1, 1963 2 Sheets-Sheet 2

WAYNE T. MARTIN
INVENTOR.

BY
Atty.

3,192,850
MANIFOLD
Wayne T. Martin, Lubbock, Tex., assignor to Electric Heating Supply, Inc., Lovington, N. Mex., a corporation of New Mexico
Filed Feb. 1, 1963, Ser. No. 255,513
4 Claims. (Cl. 98—38)

This invention relates to air ducts and more particularly to a manifold for heating and ventilating air ducts.

In home construction a problem exists with hot air furnaces. With these there is a large air duct leading from the furnace. It is necessary to have several smaller ducts conveying hot air to different parts of the house. The connection of these smaller ducts to the large duct is time consuming, requiring a high degree of skill on the part of a well-trained craftsman.

In some areas of the country an evaporative air conditioning system is used wherein conditioned air from a conditioner on the roof is brought by a large duct into the same air distribution system as used by the heater. I have improved the valve system so that the evaporative cooler may be used in the summer and the heater used in the winter.

I have invented a manifold or plenum that inexpensively solves the problem. The manifold includes a large air inlet at the bottom. Around the sides there are a plurality of openings facing a plurality of directions. These are all the same size and adapted to have a sheet metal plate slide in and out in front of each opening. These plates may either have a blank face so that there is no opening in that direction or they may have an opening with a circular flange surrounding the opening. These circular flanges can be in the standard sizes of the smaller ducts which may be used, e.g. they can be 2½, 3, 4, and 6 inch diameters as are customarily used to convey the air in different directions. If an air cooler is used in connection with the air distribution system, it is a simple matter to have the air conducted into the manifold from the top. A valve is mounted for vertical translational movement so that it seals off the opening not being used for that season and opens the other opening.

An object of this invention is to provide an air duct manifold for distributing air to a number of small air ducts from a single large source of supply.

Another object of this invention is to provide a simple valve means for having a manifold chamber supplied from either of two different sources.

Still further objects are to achieve the above with a device that is sturdy, compact, durable, simple, versatile, and reliable, yet inexpensive and easy to manufacture and install.

The specific nature of the invention as well as other objects, uses, and advantages thereof will clearly appear from the following description and from the accompanying drawing, the different views of which are not necessarily to the same scale, in which.

Figure 1:
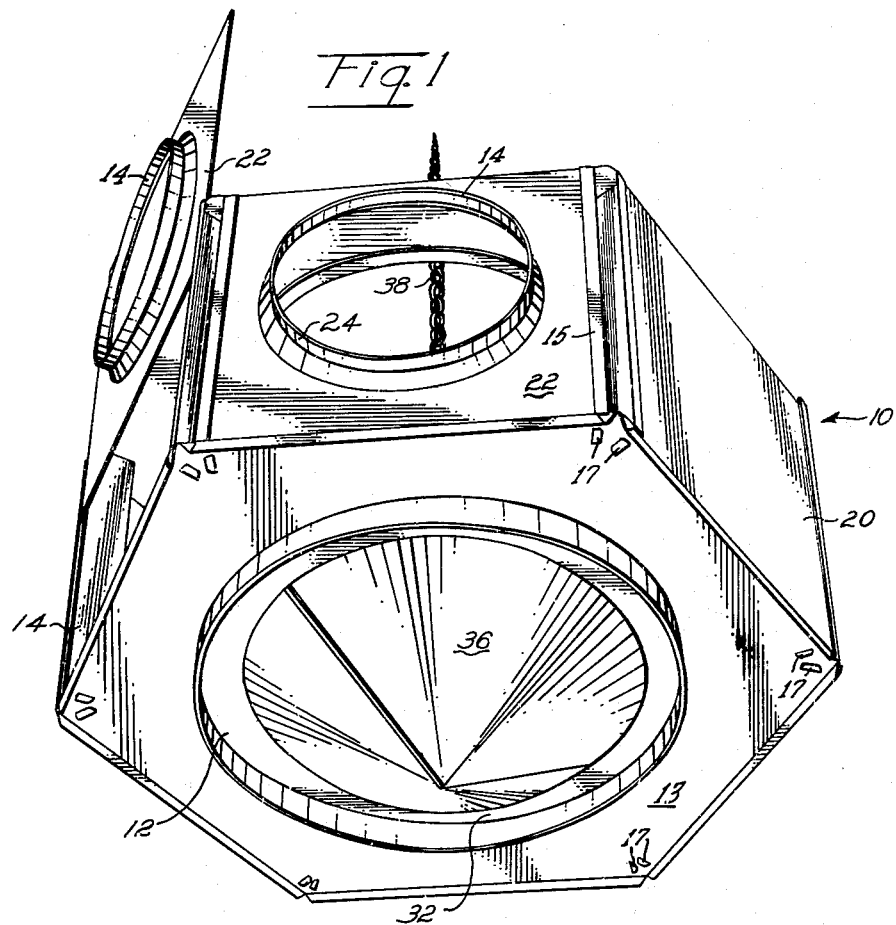
FIG. 1 is a perspective view of a manifold according to my invention.
Figure 2:
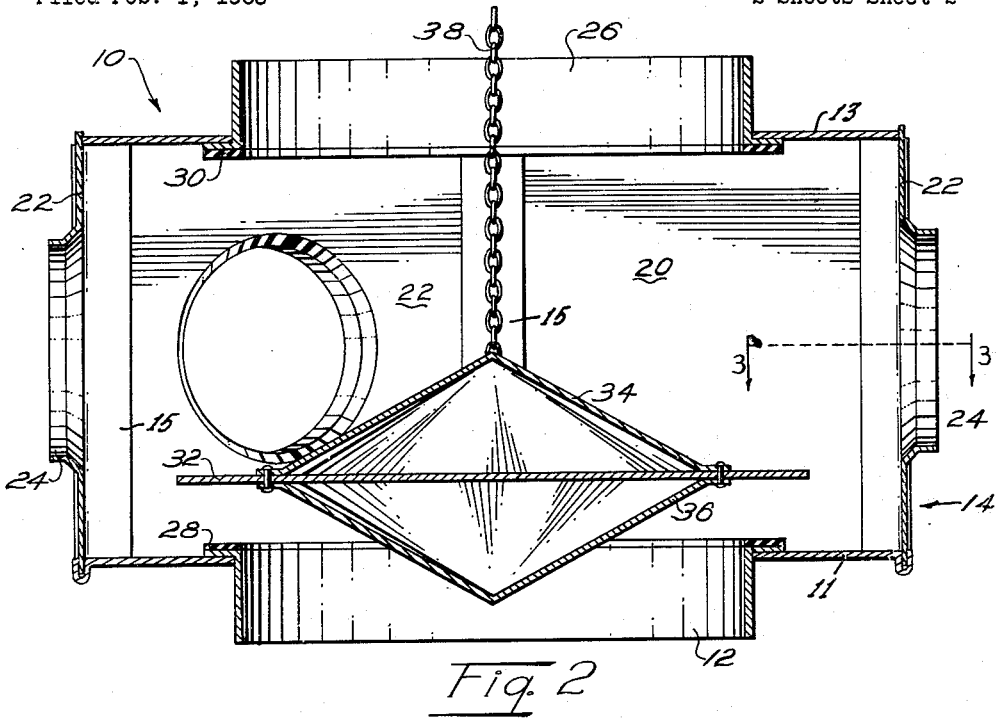
FIG. 2 is an axial sectional view of the manifold.
Figure 3:
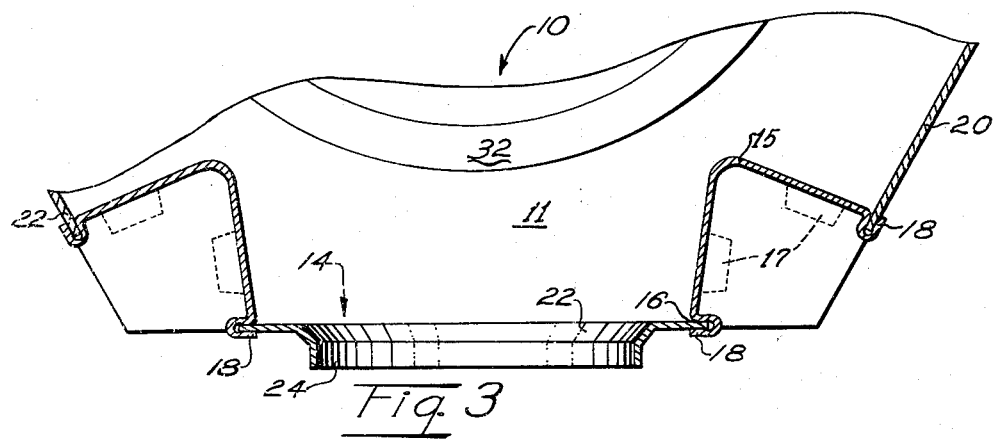
FIG. 3 is a sectional view of one side of the manifold taken on line 3—3 of FIG. 2.

As may be seen in the drawings, chamber 10 has large inlet opening 12 on the bottom and a plurality of outlets 14 around the side. The chamber 10 is adapted to be located above a hot air furnace (not shown) to receive the hot air from the furnace through the inlet 12. The chamber 10 is illustrated as hexagonal in horizontal cross-section, each side having an outlet 14; therefore the opening faces a plurality of directions. The chamber 10 is formed of top plate 11 and bottom plate 13 securely connected by six corner members 15. Tabs 17 on corner members 15 insert through the holes in the top plate 11 and bottom plate 13 to secure the elements together as shown in the drawing. The opening 12 is formed in the bottom plate 13 and the outlets 14 are between corner members 15.

On the chamber 10, on each side of each outlet 14 there is a slide groove 16 formed by flange 18 on the corner member 15 and extends away from the surface and parallel to the surface so that plate 20 may be inserted into slide groove 16.

A plurality of plates are provided. Some of them such as plate 20 are blank; i.e. they are solid pieces of sheet metal having no opening in them. When one of these are placed over one of the openings in the chamber 10 the air cannot leave in this direction and is forced through one of the other openings 14. The other plates such as plate 22 have openings which are surrounded with a circular flange 24. Plate 22 is placed within the slide groove 16 with the circular flange 24 pointing outward. The circular flange 24 furnishes a convenient means for attaching a circular duct thereto to convey the air to the area where desired. Obviously plates 22 may be provided with openings and flanges of different sizes, i.e. they can be provided in 2½, 3, 4, or 6 inch diameters. Therefore if it were desired to have a 3 inch duct going in a certain direction, a plate 22 with a 3 inch diameter flange 24 could be placed in one of the grooves 16 over the outlet 14 heading in that general direction. Also if it were desired to have a 6 inch duct going in another direction, it would be possible to place a plate 22 having a 6 inch diameter flange 24 over one of the outlets 14 headed in that general direction.

All outlets 14 which do not have a plate 22 over them would have a plate 20 over them so that all of the air is directed into a duct which is received by the manifold or chamber 10.

The chamber 10 also has inlet 26 in the top plate 11. The inlets 12 and 26 are of correlative size and shape and are axially aligned. Rubber gasket 28 surrounds opening 12, and rubber gasket 30 surrounds inlet 26 thus forming a valve seat around each inlet. Valve 32 is in the form of a flat sheet metal disc. It is, of course, larger than the valve seats formed by gaskets 28 and 30. Therefore when it is flat against the gasket 30 it seals off the inlet 26 leaving the inlet 12 open. When it is flat against gasket 28 it seals off inlet 12 leaving inlet 26 open. Cone 34 is constructed of sheet metal and is attached to the upper surface of valve 32 with the base of the cone 34 attached to the valve 32. Sheet metal cone 36 is attached to the lower surface of the valve 32 with the base of the cone attached to the valve. The cones, valve, and valve seats are all co-axial. Chain 38 forms a means for operating the valve 32 and is attached to the apex of cone 34. If the chain 38 is slack the valve 32 will be sealed against gasket 28, closing the lower inlet 12. If the chain 38 is taut and the valve 32 lifted, the valve will be tightly sealed against the gasket 30. In the lower position the cone 34 will spread the air entering through inlet 26 through the various outlets 14. Likewise if the valve 32 is in the upper position the cone 36 will spread the air to the various outlets 14.

If the manifold is to be used over a furnace only, it would only have the one inlet 12. The top plate 11 would be sealed by permanently attaching a valve disc 32 to the top of the chamber and eliminating the cone 34 and the chain 38 as superfluous.

As may be seen, I have provided a simple manifold for distributing air from either of two inlets into a plurality of outlets facing in different directions. Also it may be seen that I have provided a versatile manifold where the size and direction of the outlets are readily within the control of the semi-skilled labor installing the manifold. Furthermore it may be seen that I have provided a manifold which is readily adaptable for the duct system of variously constructed homes having ducts of various sizes leading in different directions.

It will be apparent that numerous changes could be made. For example, I have illustrated a manifold having six sides and six outlets 14. Obviously the manifold could be made with 3, 4, 5, 6, 7, or 8 sides as well as 6. Also I have shown the inlet and outlet flanges as being circular. Obviously these could be made rectangular or any other shape desired.

It will be apparent that the embodiment shown is only exemplary and that various modifications can be made in construction, material and arrangement within the scope of the invention as defined in the appended claims.

I claim as my invention:

1. A manifold for an air distribution system comprising:
   (a) a chamber having top, bottom, and side walls,
   (b) a hot air inlet on the bottom,
   (c) a cold air inlet on the top,
   (d) the two inlets axially aligned and
   (e) of correlative size and shape,
   (f) a valve seat surrounding each of said inlets, and
   (g) a plurality of outlets on the sides,
   (h) a valve mounted within the chamber, and
   (i) means for operating said valve in a vertical translational movement between said valve seats.

2. The invention as defined in claim 1 with the addition of
   (j) a cone on each side of the valve with
   (k) the base of the cone on the valve.

3. The invention as defined in claim 1 with the addition of
   (j) means on the side walls for attaching a plate over each outlet opening, and
   (k) at least one plate attached over an outlet opening having an opening with
   (l) a circular flange surrounding the opening.

4. A manifold for air distribution systems comprising:
   (a) structure defining a chamber having
   (b) a top plate and
   (c) a bottom plate with a hot air opening therein,
   (d) V-shaped corner members,
   (e) means of securing the corner members to the top and bottom plates in spaced relationship as to form openings between said members
   (f) facing a plurality of directions,
   (g) slide groove means formed in the vertical side edges of said members adjacent to said openings
   (h) a plate in each of said slide grooves,
   (j) at least one plate being solid without openings, and
   (k) at least one plate having an opening surrounded by
   (m) a circular flange,
   (n) said top plate having a cold air inlet opening therein
   (o) aligned with a hot air inlet opening,
   (p) a valve seat surrounding each said inlet, and
   (q) a valve mounted within the chamber or for vertical translation movement between said valve seats.

References Cited by the Examiner

UNITED STATES PATENTS

| | | | |
|---|---|---|---|
| 1,882,675 | 10/32 | Smith | 128—114 |
| 2,302,818 | 11/42 | Turner | 98—33 |
| 2,337,382 | 12/43 | Frankland | 98—33 |
| 2,349,668 | 5/44 | Marker | 98—43 |

ROBERT A. O'LEARY, *Primary Examiner.*